(12) United States Patent
Berkey

(10) Patent No.: US 6,389,207 B1
(45) Date of Patent: May 14, 2002

(54) DISPERSION MANAGED FIBER

(75) Inventor: George E. Berkey, Pine City, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/460,212

(22) Filed: Dec. 13, 1999

(51) Int. Cl.$^7$ ............................................. G02B 6/02
(52) U.S. Cl. .................................. 385/124; 385/126
(58) Field of Search .............................. 385/123, 124, 385/125, 126, 127; 65/412, 411, 421, 422

(56) References Cited

U.S. PATENT DOCUMENTS

| | | | |
|---|---|---|---|
| 4,049,413 A | 9/1977 | French | |
| 4,076,380 A | 2/1978 | DiMarcello et al. | |
| 4,715,679 A | 12/1987 | Bhagavatula | |
| 5,483,612 A | 1/1996 | Gallagher et al. | |
| 5,613,027 A | 3/1997 | Bhagavatula | |
| 5,613,028 A | 3/1997 | Antos et al. | |
| 5,673,354 A | 9/1997 | Akasaka et al. | |
| 5,935,874 A | * 8/1999 | Kennard | 438/710 |
| 5,999,679 A | * 12/1999 | Antos et al. | 385/127 |

FOREIGN PATENT DOCUMENTS

| | | |
|---|---|---|
| EP | 0 737 873 | 10/1996 |
| EP | 0 935 146 | 8/1999 |
| GB | 1 448 080 | 9/1976 |
| WO | 92/10014 | 6/1992 |
| WO | 99/54763 | 10/1999 |

OTHER PUBLICATIONS

"Glass Its Industrial Applications", Charles John Philips, School of Ceramics Rutgers, The State University New Brunswick, New Jersey, Reinhold Publishing Corporation, New York, pp. 36–43.
"Centrifuging Glass Tubing", E.G. Evans, Proceedings The Eleventh Symposium on the Art of Glassblowing, The American Scientific Glassblowers Society, Statler Hilton Hotel Boston, Massachusetts, Jun. 8–10, 1966, pp. 166–171.
Fiber Optic Communications Fourth Edition, "*Optical Fiber Waveguide*", Chapter 5, Joseph C. Palais, Prentice Hall, ISBN: 0–133–895442–9, pp. 102.105.

* cited by examiner

*Primary Examiner*—Cassandra Spyrou
*Assistant Examiner*—Euncha Cherry
(74) *Attorney, Agent, or Firm*—Timothy R. Krogh

(57) ABSTRACT

The invention disclosed is an optical fiber which includes a central core glass region with a first refractive index profile. The fiber includes a second core glass region adjacent to and surrounding said central region, said second region having a thickness that varies along an axial direction of said second region and having a second refractive index profile that differs from said first profile. Additionally, the invention includes an optical fiber preform that can be drawn into the above fiber. The invention also includes the method of making the above describe optical fiber. Furthermore, the invention may also be practiced to make an optical fiber preform in accordance with the aforementioned invention. The aforementioned fiber and preform is particularly useful as a dispersion managed fiber or dispersion managed preform respectively.

31 Claims, 4 Drawing Sheets

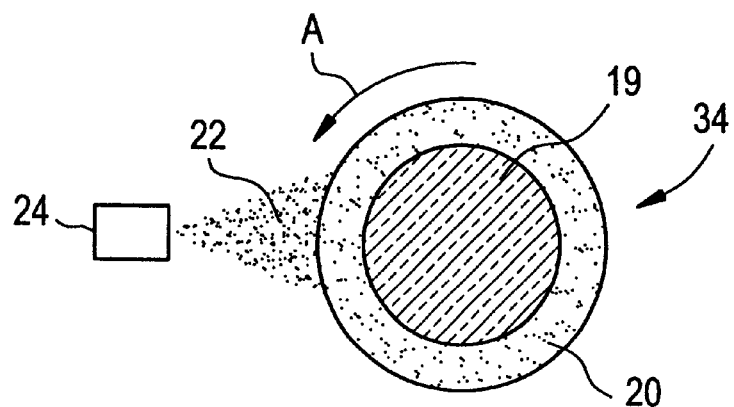
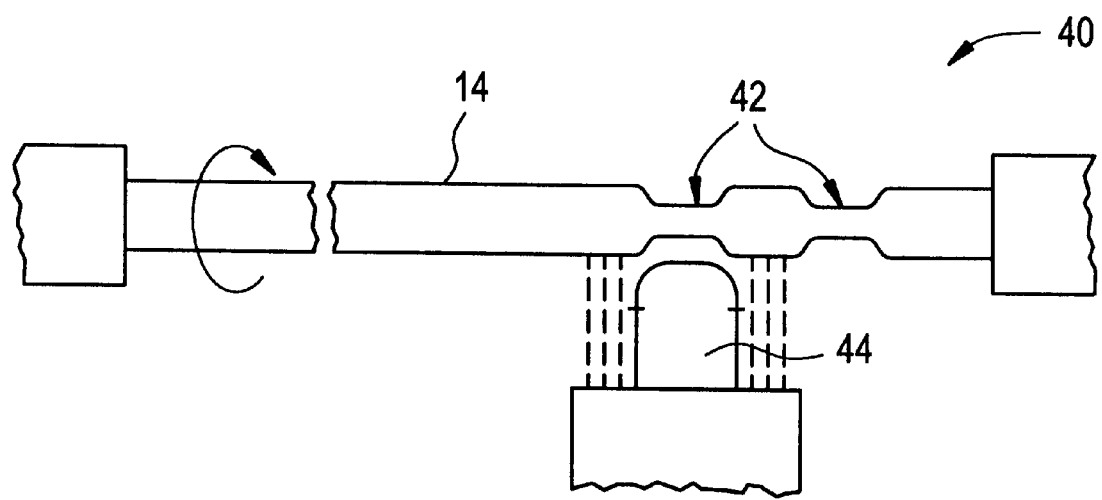

DISPERSION MANAGED FIBER

BACKGROUND OF THE INVENTION

1. Filed of the Invention

The present invention relates generally to the field of optical fibers, and particularly to dispersion managed optical fibers and methods of the making the fibers.

2. Technical Background

The recent advent of wavelength division multiplexing and amplifiers has increased system requirements to lower the dispersion and dispersion slope of the optical fiber. Several methods of making dispersion managed fiber have previously been disclosed that address these properties. See, for example, U.S. patent application Ser. No. 08/844,997 (Berkey et al.) filed Apr. 23, 1997, and U.S. patent application Ser. No. 08/584,868, filed Jan. 11, 1996, the specifications of which are all hereby incorporated by reference.

Many of the methods to date have been relatively complex and therefore may involve higher cost than more standard methods of manufacture because of this complexity. It would be desirable to develop an alternative, easier method to manufacture optical fiber whose dispersion characteristics vary between positive and negative along the longitudinal direction of the optical fiber, particularly in the 1550 nm operating window.

SUMMARY OF THE INVENTION

One aspect of the present invention is an optical fiber which includes a central core glass region with a first refractive index profile. The fiber also has a second core glass region adjacent to and surrounding said central region, said second region having a thickness that varies along an axial direction of said second region and having a second refractive index profile that differs from said first profile.

Another aspect of the invention is an optical fiber preform which includes a central core glass or soot region with a first refractive index profile. The fiber also has a second core glass region adjacent to and surrounding said central region, said second region having a thickness that varies along an axial direction of said second region and having a second refractive index profile that differs from said first profile.

A further aspect of the invention includes a method of making an optical fiber preform. This method includes inserting a rod of a material suitable for forming a glass region into a glass tube having a varying wall thickness along its axial or length direction. The material of the rod has a different refractive index profile than the material of the tube. The invention may also include a method of making an optical fiber.

A fiber produced in accordance with the invention includes the advantage of being a dispersion managed fiber. A fiber produced in accordance with the invention also has the advantage of being seed free. The method of producing a dispersion managed fiber in accordance with the invention is an easily industrializable process.

Additional features and advantages of the invention will be set forth in the detailed description which follows, and in part will be readily apparent to those skilled in the art from the description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 2 is a cross sectional schematic view of a soot being deposited on a consolidated and tube assembly;

FIG. 3 is a schematic view of glass flame working of a tube;

DETAILED DESCRIPTION OF THE PREFERRED EMBODIMENTS

Figure 1:
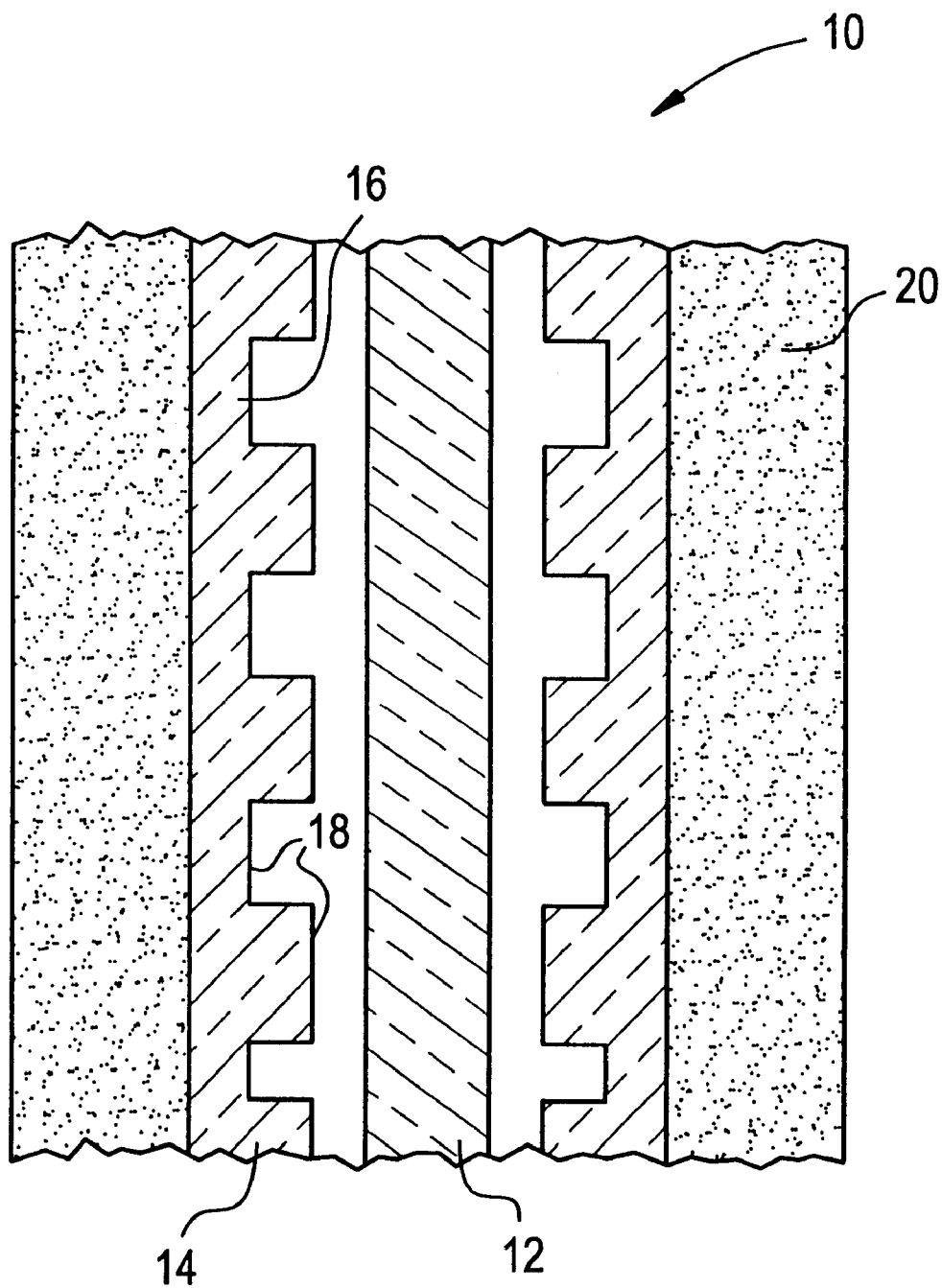
FIG. 1 is a cross sectional view of a segment of a soot coated tube and rod in accordance with the invention.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the apparatus for making an optical fiber preform in accordance with the invention is shown in FIG. 1, and is designated generally throughout by reference numeral 10.

In accordance with the invention, the present invention for an optical fiber includes a rod 12 of a material suitable for forming a glass region. The material of rod 12 has a first refractive index profile. Examples of a suitable material for rod 12 include silica or silica doped with germanium. However, the invention is not limited to either specific example. Also the rod 12 may be a soot or a glass when it is positioned within a glass tube 14. The rod 12 is positioned in the tube 14 such that after the tube 14 is collapsed onto the rod 12 and the assembly is consolidated into a preform, rod 12 can form a central core of an optical fiber drawn from the preform.

Figure 4:
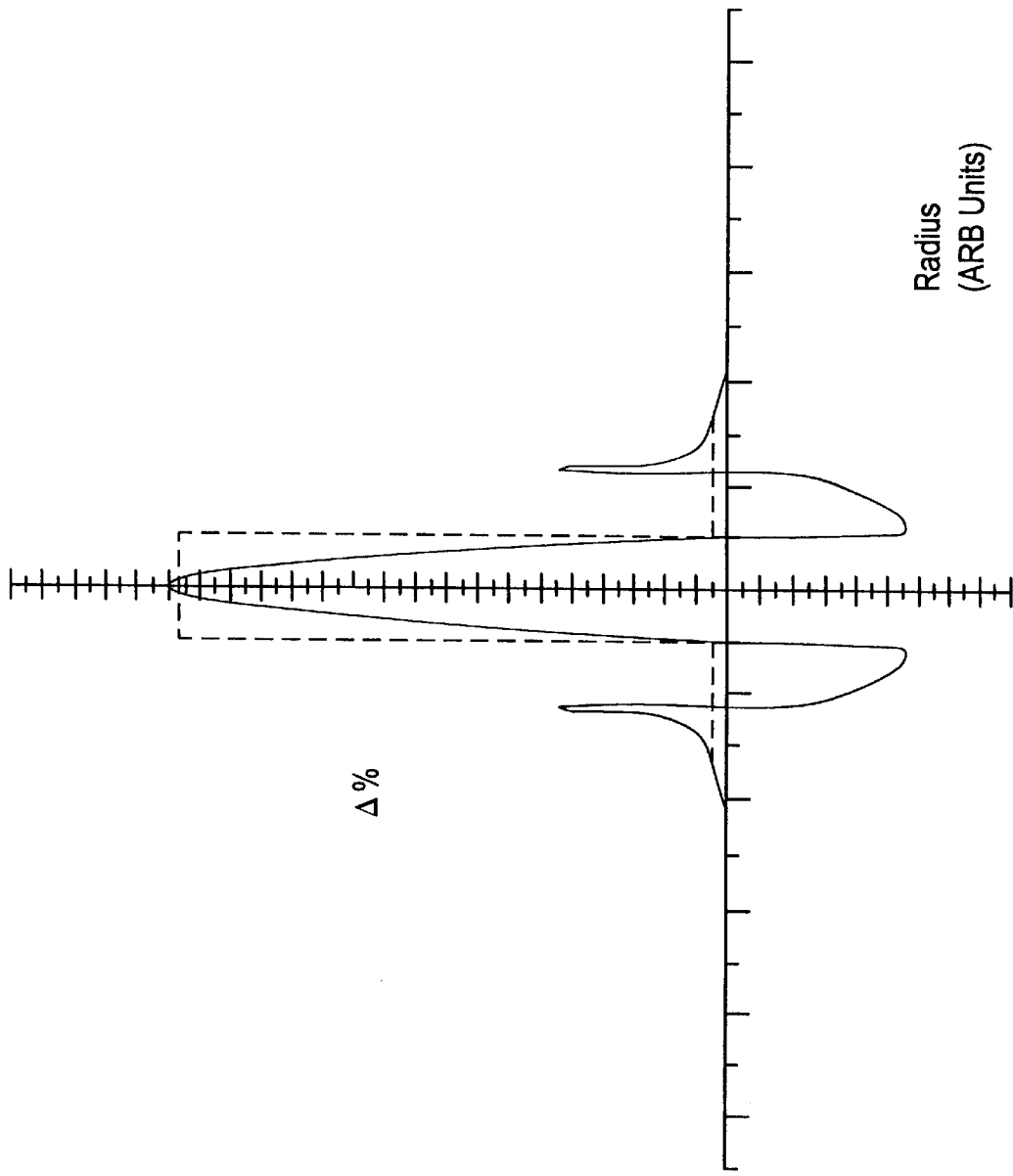
FIGS. 4 and 5 are examples of refractive index profiles of an optical fiber drawn from a preform made accordance with the invention.
Figure 5:
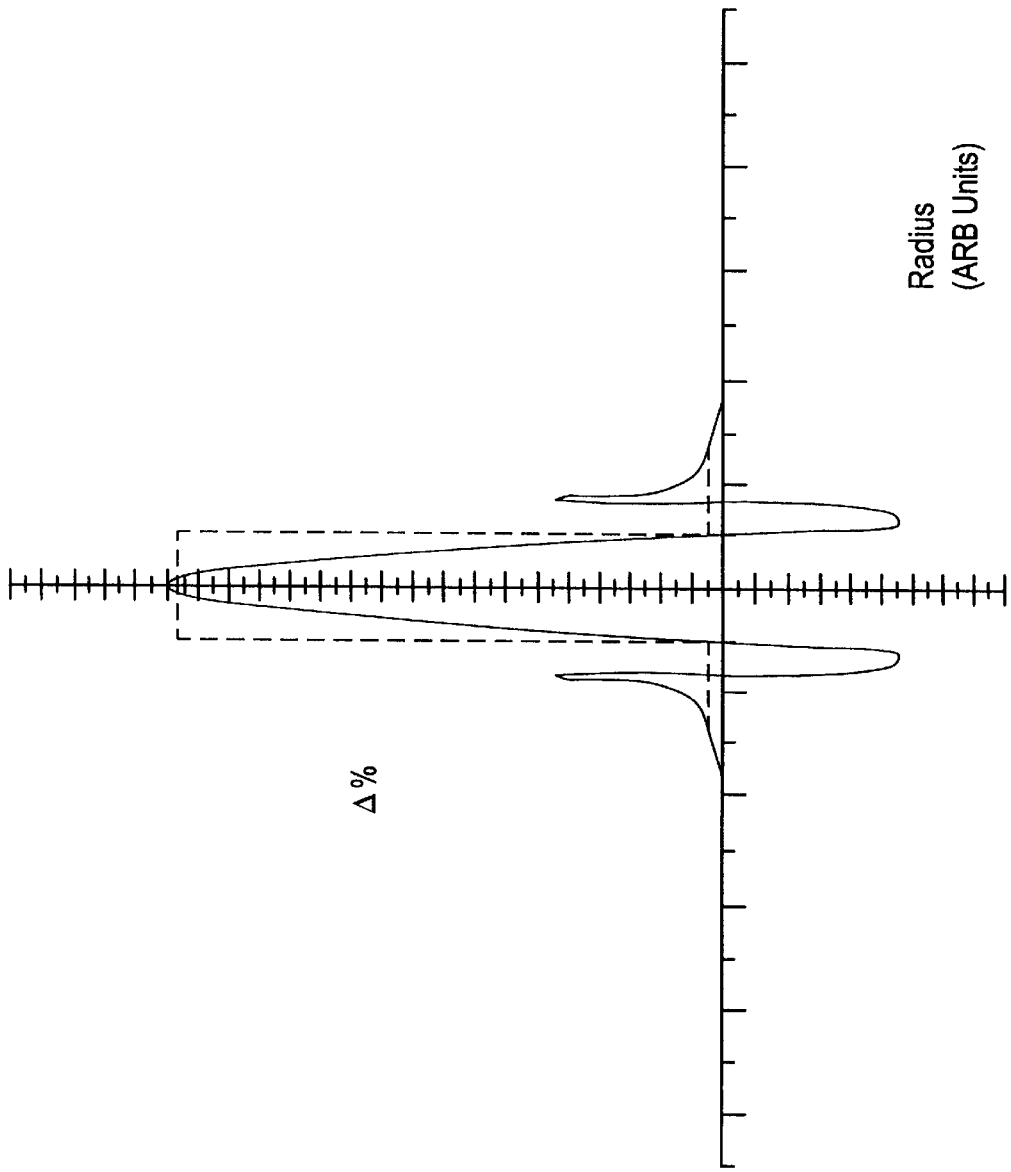

Glass tube 14 is a material that has a second refractive index profile that differs from the first profile of the rod 12. Preferably, tube 14 will have more than one refractive index profile, as shown in FIGS. 4 and 5. The choice of material for tube 14 will depend upon the choice of material of rod 12. The refractive index profile of tube 14 preferably is not the same as the refractive index profile of rod 12. For example, when the rod 12 is composed of silica or germanium doped silica, the tube 14 is preferably composed of silica that is doped with a refractive index lowering dopant, such as fluorine or boron. Fluorine is a preferred refractive index lowering dopant for a silica tube. Alternatively, the tube 14 may be doped with a refractive index raising dopant such as germanium. The invention is not limited by the choice of materials for the rod 12 or the tube 14. Tube 14 can form a second core region adjacent to and surrounding the central core region of the drawn fiber.

The tube 14 may be made from depositing soot on a mandrel and consolidating the soot into a glass tube. The tube can be heated in a furnace in a fluorine doping atmosphere prior to and/or during consolidation to dope the tube with fluorine. The tube 14 is heated in the furnace for a predetermined time and temperature depending on a preselected amount of fluorine doping desired.

Tube 14 includes a wall 16 that varies in thickness in the axial direction of the tube 14. The axial direction may also be referred to as the length direction. In varying the thickness of the wall 16, preferably, the outer diameter of the tube 14 remains constant. The wall 16 has an inner surface 18. The inner surface 18 is disposed adjacent the rod 12. The distance between the surface 18 and the rod 12 will vary from point to point along the axial direction of rod 12. Alternatively, the outer diameter of the tube may vary in diameter along the axial direction of the tube 14 (not shown). Wall 16 may also be referred to as a thickness of tube 14.

As for the thickness of wall 16 of the tube 14, the axial variance of the wall thickness can be uniform or nonuniform. The wall thickness may vary in a sinusoidal pattern or a nonsinusoidal pattern. Preferably the thickness of the wall 16 will repeatedly increase and decrease along the axial direction of the tube 14. This may also be referred to as the tube 14 having more than one cycle. Also the thickness of the wall 16 is not limited by a minimum thickness. The wall 16 may be infinitesimally thin at certain locations along the length of the tube 14.

Preferably, a refractive index profile of rod 12 and tube 14 assembly should be radially symmetric at any axial point along the assembly. Preferably, the refractive index will uniformly vary along the radius of the assembly.

Soot 20 may be deposited on the outside of the tube 14. This is shown in FIG. 2. As illustrated in FIG. 2, the soot 20 is deposited on the assembly 19 of the tube 14 collapsed onto the rod 12. The soot 20 is composed of a plurality of individual particles of soot material 22. The soot particles 22 are discharged from a deposition burner 24. Any type of deposition burner may be used to practice the invention. Preferably during deposition, the soot coated assembly 34 is rotated in the direction of arrow A.

The soot 20 preferably is a material that has a third refractive index profile. The refractive index profile of the soot 20 should differ from the refractive index profile of the tube 14. The soot 20 may be composed of undoped silica, fluorine doped silica, germanium doped silica, or combinations thereof. The soot 20 may be disposed on the tube 14 by any known technique, including but not limited to, outside vapor deposition. The soot 20 is not required to practice the invention.

The fiber that ultimately is drawn from the apparatus 10 is preferably a dispersion managed fiber. A dispersion managed fiber is a fiber in which the dispersion alternates from positive to negative, or vice versa, along the length of the fiber. To draw the dispersion managed fiber from the apparatus 10, rod 12 is inserted into the tube 14. The tube 14 is collapsed onto the rod 12. Preferably, rod 12 is consolidated into a glass before the tube 14 is collapsed onto the rod 12. If both the rod 12 and tube 14 are glass, consolidation will not be needed.

The tube 14 may be collapsed onto the rod 12 by any known technique, such as, applying a vacuum to bring the rod 12 into contact with the inner surface 18 of the tube 14. Applying the vacuum to the tube 14 will collapse the center hole of the tube 14 around the rod 12. Another known technique is to heat the rod and tube assembly to a sufficient temperature to deform the rod and tube assembly into a glass preform. During collapsing the tube 14 on the rod 12, chlorine may be passed between the rod 12 and the tube 14 for cleaning. Closing the hole and consolidating the rod 12 tube 14 assembly converts the assembly into a precursor body 19.

The glass preform of the rod and tube assembly is shown in FIG. 2. Additional soot 20 may then be deposited onto the body 19, to form a soot coated preform 34. The soot is consolidated into a glass forming a complete optical fiber preform or blank. The optical fiber may be drawn from this optical fiber preform. This preform is preferably a dispersion managed optical fiber preform.

The soot 20 may be deposited either before or after the rod 12 is inserted into the tube 14. As an additional option, an overcladding layer (not shown) may be deposited on the soot 20. One example of typical overcladding material is silica.

Several techniques may be used to vary the thickness of the wall 16 in the axial direction of the tube 14. The thickness of the wall 16 may be altered by etching the surface 18 of the tube 14. The inner surface 18 is selectively masked with a masking agent. The masking agent protects the areas of the surface 18 covered with the masking agent from the etchant. The etchant is selectively passed along the inner surface 18 of the tube 14. "Selectively" is used to indicate that the etchant will only etch the unmasked portions of the inner surface 18 and that only preselected portions of the inner surface are coated with a masking agent. The etchant will remove an amount of material from the unmasked portions of the inner surface 18. To further alter the thickness of wall 16 or to etch a different section of the inner surface 18, the process of masking preselected areas of inner surface 18 which are not desired to be etched and selectively passing the etch along the inner surface 18 is repeated.

A suitable etchant includes prefluoro gases. Preferred gases include $NF_3$, $SF_6$, and mixtures thereof. A more preferred etchant is $NF_3$. $NF_3$ may be used to etch a glass tube at temperatures below the glass transition temperature of the tube 14. Therefore, the glass of tube 14 would not be malleable and the thinning of the wall 16 is easier to control. Many other etchants require a temperature above the glass transition temperature to etch glass.

Alternatively, the thickness of wall 16 may also be manipulated by glass flame working techniques, as shown in FIG. 3. In glass flame working, a section of the tube 14 is heated to at least the softening point of the material of construction of the tube 14, indicated by reference numeral 42. Preferably the tube 14 is rotated during the heating step. In FIG. 3, the tube 14 is not shown being internally pressurized. It is preferred that the tube 14 is heated with a dry heat source 44. However the invention is not limited to flame working with only a dry heat source.

A second example of the heat source is an induction coil. The induction coil may have a graphite heating element. The induction coil may be disposed on the inside or the outside of the tube 14.

Once the section 42 of the tube 14 is heated to at least its softening point, the tube 14 may be pulled to manipulate the thickness of the wall 16 at the heated section 42. Pulling may also be defined as a stretching or elongation of the heated section 42 of the tube 14. To manipulate the thickness of the wall 16 at other sections, this heating and pulling process is repeated.

Optionally, the tube 14 may be internally pressurized during heating of the tube 14. Pressurizing the tube 14 during heating prevents sagging of the heated section of the tube 14. Any inert gas may be used to pressurize the tube 14, such as nitrogen or any other inert gas. This may also aid in maintaining a constant outer diameter of the tube 14.

Optionally, in the case of heating the tube 14 with a nondry heat source, any additional step of drying the tube 14 may be practiced to remove any residual water formed on the tube 14. The drying of the tube 14 may be accomplished by passing a dry gas around the tube 14. This step may be also be practiced if a dry heat source is used.

In a third embodiment, the technique of varying the thickness of wall 16 may include both etching and flame working. The thickness of wall 16 may be varied by selectively passing an etchant gas along the surface 18 of the tube 14 during the heating and pulling of the tube 14. The type of etchant gas will depend on the amount of heat applied to the tube 14. For example, if the tube 14 is heated above 800 deg. C, a suitable etchant gas is $SF_6$. The above method may be practiced to produce either an optical fiber or an optical fiber preform.

FIGS. 4 and 5 illustrate refractive index profiles for alternating segments along the preform showing the thick and thin walled sections of the tube, respectively. The preform includes a germanium doped silica rod, a fluorine doped silica tube, a germanium doped silica over the fluorine doped tube, and a silica cladding.

FIGS. 4 and 5 are examples of a refractive index profile of a preform that, when made in accordance with the invention via a tube having varying wall thickness along the axial direction of the tube, can be drawn into an optical fiber that alternates along the length of the fiber between regional positive and negative dispersion at 1550 nm. The graph is a plot of the radius, in arbitrary units, versus an index measurement of delta ($\Delta$).

$$\Delta_o=(n_o^2-n_c^2)/2(n_o^2)$$

The $\Delta_o$ is the $\Delta$ of any particular region with respect to the index of refraction of the cladding. The $n_o$ is the index of refraction of a particular region of the fiber and $n_c$ is the index of refraction of the cladding.

The preform of FIG. 4 is an example of a section of the preform that can be drawn into an optical fiber that can achieve a both a negative dispersion and a negative dispersion slope.

FIG. 5 represents a section of the fluorine tube that has been thinned, in comparison to FIG. 4. The section of FIG. 5 is an example of a section of a preform that, can be drawn into an optical fiber that can achieve both positive dispersion and positive dispersion slope at 1550 nm. An optical fiber with this type of section is particularly useful in lowering the positive dispersion slope so that both the total dispersion and the slope can be compensated to be nearly zero. Also the fiber having the profile shown in FIG. 5 may have both positive and negative dispersion.

In a preferred embodiment of the invention, the delta ($\Delta$) percentage index change from the tube and the clad is more negative than about 0.25%, more preferably greater than about 0.4%. The amount of fluorine in the tube of FIG. 5 is in the range of about 0.6 to 1.3% be weight.

In a preferred embodiment, the profiles of the type illustrated in FIGS. 4 and 5 comprise a central core region having a delta percent, relative to the cladding between about +0.4 to 1.1 and a depressed moat core region (second region) which surrounds the central core region. The depressed moat preferably is in the range of −0.15 delta percent or lower (preferably no lower than −0.6 delta percent) relative to the cladding. An optional updoped annular ring may also be employed. In some preferred embodiments wherein the updoped annular ring is employed, the annular ring exhibits a delta percent which is between +0.10 and +0.8. In the embodiment illustrated in FIGS. 4 and 5, the central core may have a delta percent of about +0.85, a depressed moat of −0.4 delta percent, and an annular ring surrounding the depressed moat which has a delta percent of about 0.4 delta percent.

The radii of the three segments is measured from the centerline of the fiber to the extrapolated intersection of the refractive index profile with the x-axis, the x-axis being equal to the index of refraction of the cladding layer. In this embodiment the cladding layer may be silica. Consequently, in FIGS. 4 and 5, the outer radius of the central core is measured from the centerline to the intersection of the central core refractive index profile with the x-axis, the radius of the moat core is measured from the centerline to the intersection of the moat core of the refractive index profile with the x-axis, and the radius of the annular ring region is measured from the centerline to the extrapolated intersection of the outer, relatively straight portion of the annular ring refractive index profile with the x-axis (the tail-off region at the outermost region of the annular ring nearest the cladding layer is not considered part of the annular ring). The refractive index profile is preferably selected so that, if the radius of the first centerline up-doped segment is taken to be "a", the radius of the moat section taken to be "b", then b/a preferably is between about 1.5 to 3.0, more preferably between about 2 and 2.5. If the outer radius of the optional annular ring is "c", then c/a is preferably between about 2.5 and 3.2.

The profiles disclosed in FIGS. 4 and 5 may meet these radius limitations and also comprise a central core region having a delta percent between about +.7 to 1.0, a depressed moat core region in the range of −0.25 to −0.5 percent delta, and an annular ring surrounding the depressed moat in the range of about +0.2 to +0.8 percent.

An alternate embodiment of the invention may include a non-doped silica tube. This may be known as a raised cladding or raised profile. In this embodiment both the rod 12 and the soot 20 would consist of a material with a refractive index greater than that of silica.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A dispersion managed optical fiber comprising:
   a central core glass region having a first refractive index profile, a delta percent of said central core glass region comprises up to about 1.1%; and
   a second core glass region adjacent to and surrounding said central region, said second region having a thickness that varies along an axial direction of said second regions having a second refractive index profile that differs from said first profile, and a delta percent of said second core glass region comprises no lower than about −0.6%.

2. The fiber of claim 1 wherein said second region comprises a fluorine doped glass tube.

3. The fiber of claim 1 further comprising a cladding disposed on said second region.

4. The fiber of claim 3 wherein said cladding has a third refractive index profile which varies from said second refractive index profile.

5. The fiber of claim 3 further comprising a delta percentage that is at least as negative as −0.25 percent.

6. The fiber of claim 5 wherein said delta percentage that is at least as negative as −0.4 percent.

7. The fiber of claim 1 wherein the fiber is a dispersion managed fiber.

8. An optical fiber preform for making a dispersion managed optical fiber, comprising:

a central core glass or soot region having a first refractive index profile, a delta percent of said central core glass region comprises up to about 1.1%; and a second core glass region adjacent to and surrounding said central region, said second region having a thickness that varies along an axial direction of said second region, having a second refractive index profile that differs from said first profile, and a delta percent of said second core glass region comprises no lower than about −0.6%.

9. The preform of claim 8 wherein said second region is a fluorine doped glass tube.

10. The preform of claim 8 further comprising a cladding disposed on said second region.

11. The preform of claim 10 wherein said cladding has a third refractive index profile which differs from said second refractive index profile.

12. The preform of claim 10 further comprising a delta percentage that is at least as negative as −0.25 percent.

13. The preform of claim 12 wherein said delta percentage that is at least as negative as −0.4 percent.

14. The preform of claim 8 wherein said second core region has at least one additional refractive index profile.

15. A method of making an optical fiber preform for making a dispersion managed optical fiber, comprising the step of:

inserting a rod of a material for forming a glass region, having a first refractive index profile into a glass tube having a varying wall thickness in an axial direction of the tube and the tube having a second refractive index profile that differs from the first profile, wherein a delta percent of the rod comprises up to about 1.1% and a delta percent of the tube comprises no lower than about −0.6%.

16. The method of claim 15 further comprising the step of depositing a cladding on the tube.

17. The method of claim 16 wherein the cladding deposited has a third refractive index profile that differs from the second profile.

18. The method of claim 15 further comprising, prior to said inserting, forming the tube by selectively etching an inner surface of the tube.

19. The method of claim 18 wherein the etchant is a gas selected from the group consisting of $NF_3$, $SF_6$, and mixtures thereof.

20. The method of claim 15 further comprising, prior to said inserting, forming the tube by glass flame working techniques.

21. The method of claim 20 further comprising internally pressurizing the tube during flame working.

22. The method of claim 20 wherein said forming comprises heating a section of the glass with a deuterium flame.

23. The method of claim 20 further comprising selectively passing an etchant along an inner surface of the tube.

24. An optical fiber preform made in accordance with the method of claim 15.

25. A method of making an optical fiber comprising the method of claim 15.

26. The method of claim 25 further comprising depositing a soot on the tube and consolidating the soot forming a blank.

27. The method of claim 26 further comprising drawing an optical fiber from the blank.

28. An optical fiber made in accordance with claim 27.

29. An optical fiber preform assembly for making a dispersion managed fiber comprising:

a rod of a material for forming a glass region, having a first refractive index profile and a delta percent up to about 1.1%;

a glass tube having a varying wall thickness in an axial direction of the tube and the tube having a second refractive index profile that differs from the first profile and delta percent of no lower than about −0.6%, said tube having an interior surface adjacent and exterior surface of said rod.

30. The method according to claim 15 wherein an outer diameter of the tube remains constant along the length of the tube.

31. The method according to claim 29 wherein an outer diameter of said tub remains constant along the length of the tube.

* * * * *

UNITED STATES PATENT AND TRADEMARK OFFICE
CERTIFICATE OF CORRECTION

PATENT NO. : 6,389,207 B1
DATED : May 14, 2002
INVENTOR(S) : George E. Berkey

It is certified that error appears in the above-identified patent and that said Letters Patent is hereby corrected as shown below:

Column 6,
Line 53, should read -- region having a second refractive index profile that --

Column 8,
Line 41, should read -- diameter of said tube remains constant along the length of the --

Signed and Sealed this

Thirty-first Day of December, 2002

JAMES E. ROGAN
*Director of the United States Patent and Trademark Office*